US007236528B1

(12) United States Patent
Nie et al.

(10) Patent No.: US 7,236,528 B1
(45) Date of Patent: Jun. 26, 2007

(54) SYSTEM AND METHOD FOR PROCESSING TIME-BASED MEDIA

(75) Inventors: Xiaochun Nie, Cupertino, CA (US); Christopher L. Flick, Sunnyvale, CA (US); J. Peter Hoddie, Menlo Park, CA (US)

(73) Assignee: Apple Inc., Cupertino, CA (US)

( * ) Notice: Subject to any disclaimer, the term of this patent is extended or adjusted under 35 U.S.C. 154(b) by 638 days.

(21) Appl. No.: 10/160,379

(22) Filed: May 31, 2002
(Under 37 CFR 1.47)

(51) Int. Cl.
*H04N 7/12* (2006.01)
(52) U.S. Cl. .............................. 375/240.18; 375/240.2
(58) Field of Classification Search ............................... 375/240.03–240.29
See application file for complete search history.

(56) References Cited

U.S. PATENT DOCUMENTS

| 5,504,842 | A | 4/1996 | Gentile |
| 6,535,920 | B1 * | 3/2003 | Parry et al. .................. 709/231 |
| 6,631,206 | B1 * | 10/2003 | Cheng et al. ............... 382/164 |
| 6,731,799 | B1 * | 5/2004 | Sun et al. .................... 382/173 |

OTHER PUBLICATIONS

Arnold Gum, "Qualcomm PureVoice", Revision 3.0, Jun. 12, 1998, 7pp.
Leonardo Chiariglione—Convenor, "Short MPEG-1 description", "Coding of moving pictures and associated audio for digital storage media at up to about 1,5 Mbit/s", International Organisation Internationale de Normalisation ISO/IEC JTC1/SC29/WG11 Coding of Moving Pictures and Audio, Jun. 1996, http://www.chiariglione.org/mpeg/standards/mpeg-1/mpeg-1.htm, 3pp.
"MPEG-4 Audio Verison 3 (Final Committee Draft 14496-3 AMD1)", International Organisation Internationale de Normalisation ISO/IEC JTC1/SC29/WG11 Coding of Moving Pictures and Audio, Jul. 1999 / Vancouver, Canada, http://www.tnt.uni-hannover.de/progject/mpeg/audio/documents/w2803.html, 4pp.
"Variable Bitrate Encoding", Codec Central, http://www.siggraph.org/education/materials/HyperGraph/video/codecs/VBR.html, 2pp.
"Scalable Streaming Audio for Secure Digital Music" QDX, White Paper Version 1.0 Level: Intermediate, Copyright 2000, by QDesign Corporation, 12pp.

* cited by examiner

*Primary Examiner*—Andy Rao
(74) *Attorney, Agent, or Firm*—Blakely, Sokoloff, Taylor & Zafman LLP

(57) ABSTRACT

System and method for processing time-based media such as sequences of images, audio sequences, and the like on a computing device such as a personal computer. A method may comprise receiving a plurality of sample data, processing the sample data based on a type of the sample data, and returning a plurality of processed sample data. The processing may include performing video compression of the sample data if the sample data is video, including identifying difficult to compress frames by determining a color frequency chart for each video frame and comparing the color frequency charts of neighboring video frames. The processing may also include performing either speech to text translation or speech compression when the sample data is voice, performing music compression when the sample data is music, and performing either text to speech translation or performing language translation if the sample data is text.

26 Claims, 7 Drawing Sheets

SYSTEM AND METHOD FOR PROCESSING TIME-BASED MEDIA

BACKGROUND

1. Field of the Invention

This invention relates to a the field of processing time-based media. More specifically, the invention relates to a system and method for processing sequences of images, audio sequences, and the like on a computing device such as a personal computer.

2. Background

Computers and other processors based devices handle many kinds of data. Computers are regularly required to process data in the form of time-based media such as sequences of video, sequences of audio, and combined audio/video sequences. An example is a sequence of video shot from a camera. Another example includes sequences of still images augmented by sound that create a virtual three-dimensional view with accompanying sound. Processing of time based media is often achieved via a compressor/decompressor known as a CODEC which may be implemented in software, in hardware, or a combination of both software and hardware. Generally, a CODEC is any technology for compressing and decompressing data.

Operating systems provide utilities which may be used by application programs for various purposes, including the handling of time-based media data such as audio and video. The utilities may be provided via application program interfaces commonly referred to as APIs. Many operating systems do not provide more than rudimentary support for time-based media such as video and audio. An extension to a traditional operating system which may be included as part of an operating system or an extension which may exist in conjunction with an operating system and between application programs and an operating system may be provided to enhance the processing of video, audio, and other time based media.

BRIEF DESCRIPTION OF THE DRAWINGS

The invention described herein is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

DETAILED DESCRIPTION

The invention described herein provides various embodiments of a method and system for processing time-based media, such as the processing of sequences of images, audio sequences, and the like, on a computing device such as a personal computer. As many operating systems provide only rudimentary support for handling time-based media, the various embodiments of the systems and methods described herein provide processing or pre-processing of time-based media to application programs via an application program interface (API). The various embodiments of the methods and systems described herein may be incorporated as part of an operating system or be provided as an extension of an operating system which exists between the operating system and application programs.

Figure 1:
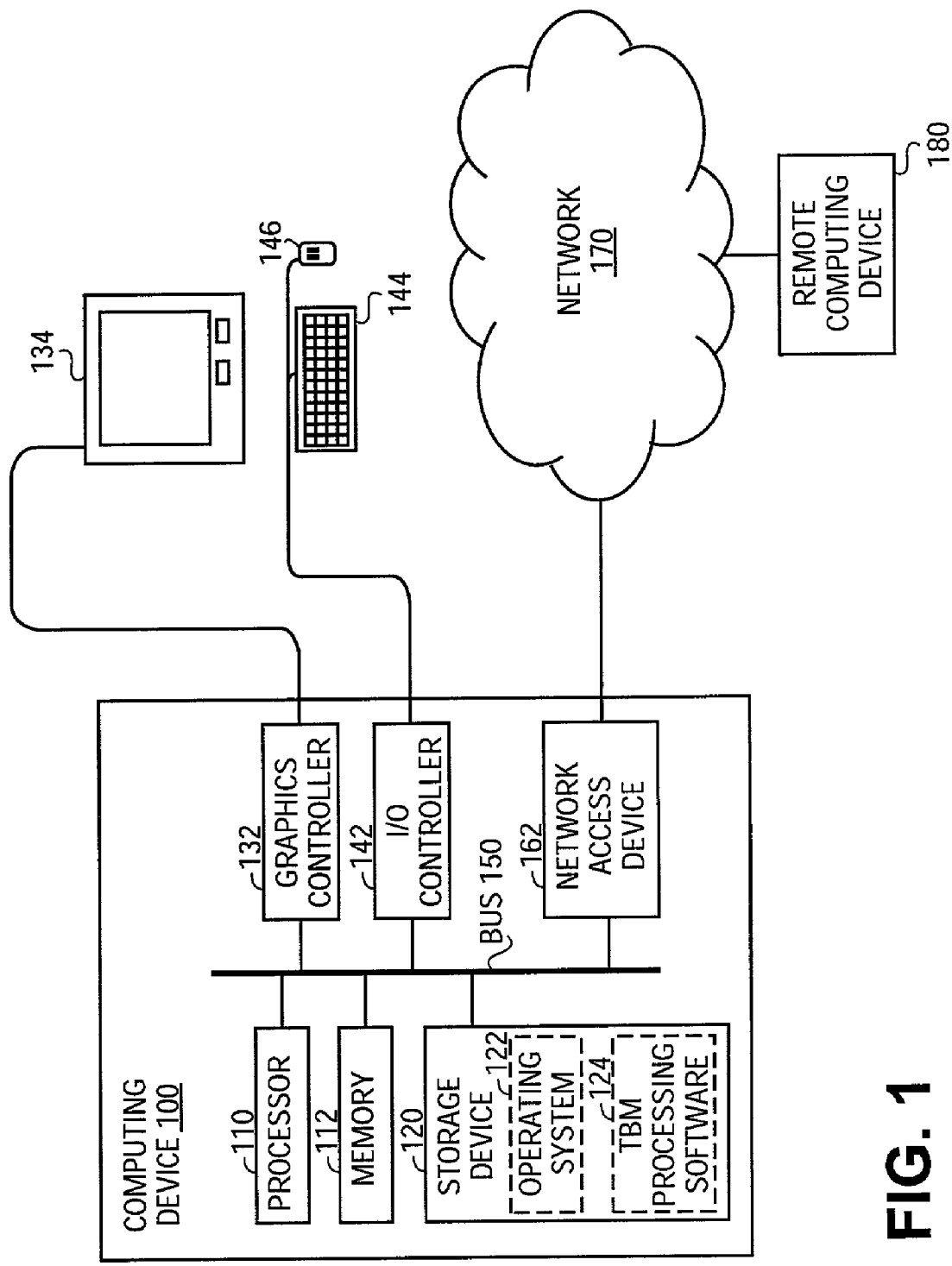
FIG. 1 illustrates a personal computing device and environment in which the embodiments of the method and system described herein may be implemented.

FIG. 1 illustrates a personal computing device and environment in which the embodiments of the method and system described herein may be implemented. Computing device 100 may be any computing device that can execute software programs, including, but not limited to, personal computers, servers, cellular telephones, computer tablets, personal digital assistants, portable computers, computer workstations etc. Computing device 100 may comprise a processor 110 to execute software programs. Processor 110 may be any computer processor known to those skilled in the art. Although only one processor is shown, two or more processors may be included in computing device 100. When executing programs, processor 100 utilizes memory 112. Memory 112 may be any form of random access memory (RAM) known to those skilled in the art. Information is read from and written to storage device 120. Storage device 120 may be any kind of machine readable medium including, for example, magnetic media such as disk drives and magnetic tape; optical drives such as compact disk read only memory (CD-ROM) and readable and writeable compact disks (CD-RW); stick and card memory devices; read only memory (ROM), RAM, flash memory devices and the like; whether internal, such as storage device 120 and, in other embodiments, directly coupled, accessible locally or remotely via network 170, and accessible via electrical, optical, acoustical or other form of propagated signals (e.g., carrier waves, infrared signals, digital signals, etc.) via network access device 162. In various embodiments, network access device 162 may be a modem, network interface unit, or other communications device that allows for communication with other computing devices, such as remote computing device 180.

Personal computer 100 may include graphics controller 132 that allows for the display of information such as text and graphic on display monitor 134. Graphics controller 132 may be any graphics controller known to those skilled in the art, and display 134 may be any display monitor known to those skilled in the art, including, for example, a cathode ray tube (CRT) display monitor and thin film transistor (TFT) display screen. A user may access computing device 100 via any input device known to those skilled in the art, such as, for example, keyboard 144, mouse 146, track ball (not shown), keypad (not shown), pen and tablet (not shown), etc. These input devices may be coupled to computing device 100 by input/output (I/O) controller 142. In one embodiment, I/O controller 142 may be a universal serial bus (USB) controller and the input devices may be USB enabled.

Processor 110, memory 112, storage device 120, graphics controller 132, I/O controller 142 and network access device 162 may be coupled to one another via and communicate with one another over bus 150. Bus 150 may be any bus known to those skilled in the art. Although only one bus is depicted, multiple buses may be used in computing device 100. n addition, other components and controllers known to those skilled in the art (not depicted) or multiple instances of depicted components and controllers may be included in computing device 100.

The methods described may be implemented as software and stored for execution on storage device 120 of computing device 100 as time based media (TBM) processing software 124. When executing, TBM processing software may rely on and utilize functions and features made available by operating system 122. Operating system 122 may be stored on storage device 120 or another local or remote storage device. Operating system 122 may be any well known or proprietary operating system, such as, for example, Mac OS X version 10.1 available from Apple Computer, Inc. of Cupertino, Calif. In another embodiment, TBM processing software may be incorporated as part of an operating system. In other embodiments, TBM processing software may exist as hardware or as a combination of hardware and software. The TBM processing software and the computing device on which it executes may be referred to as a TBM processing system.

Figure 2A:
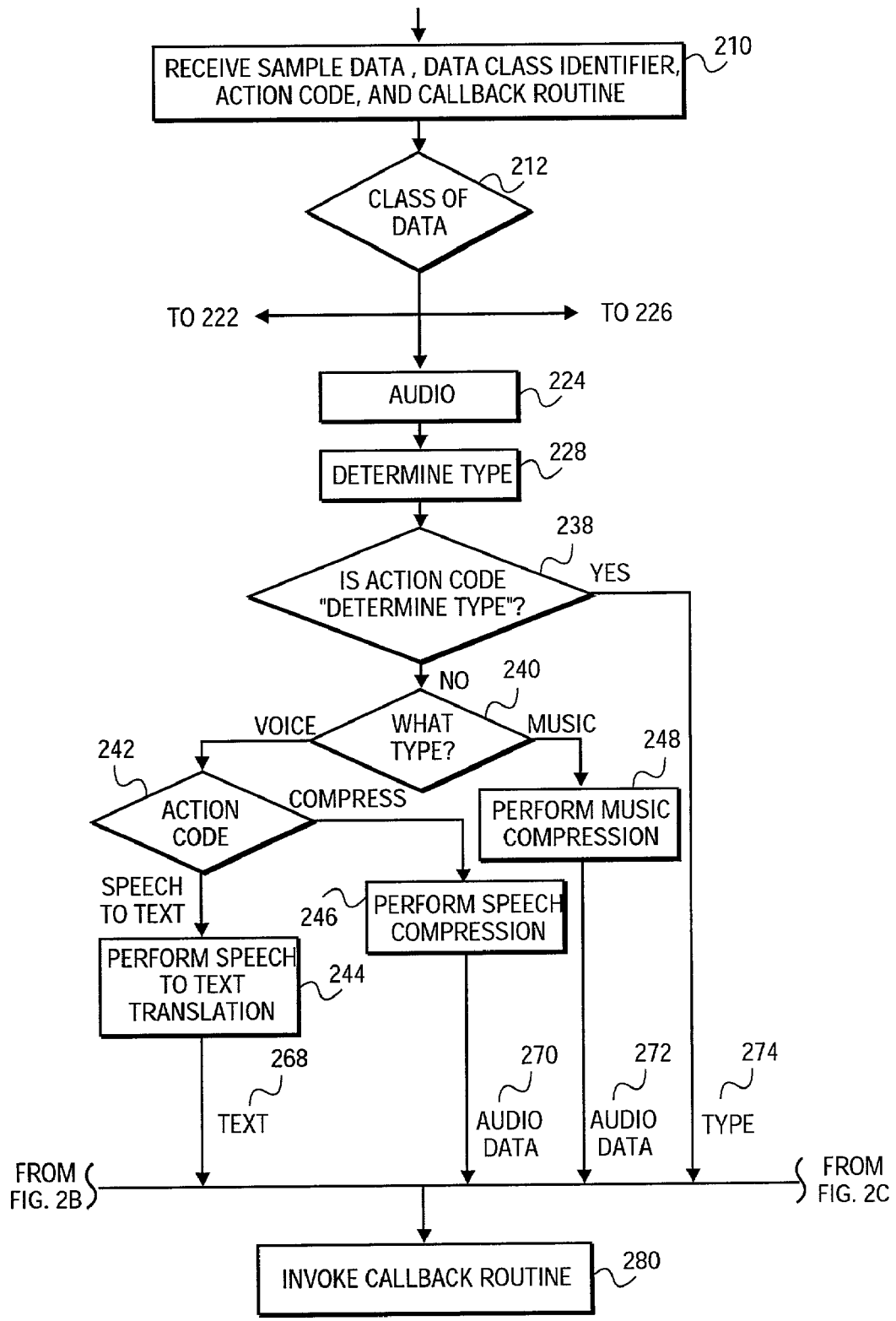
FIGS. 2A, 2B and 2C illustrate the flow of actions taken according to an embodiment of a method to process time-based media data.
Figure 2B:
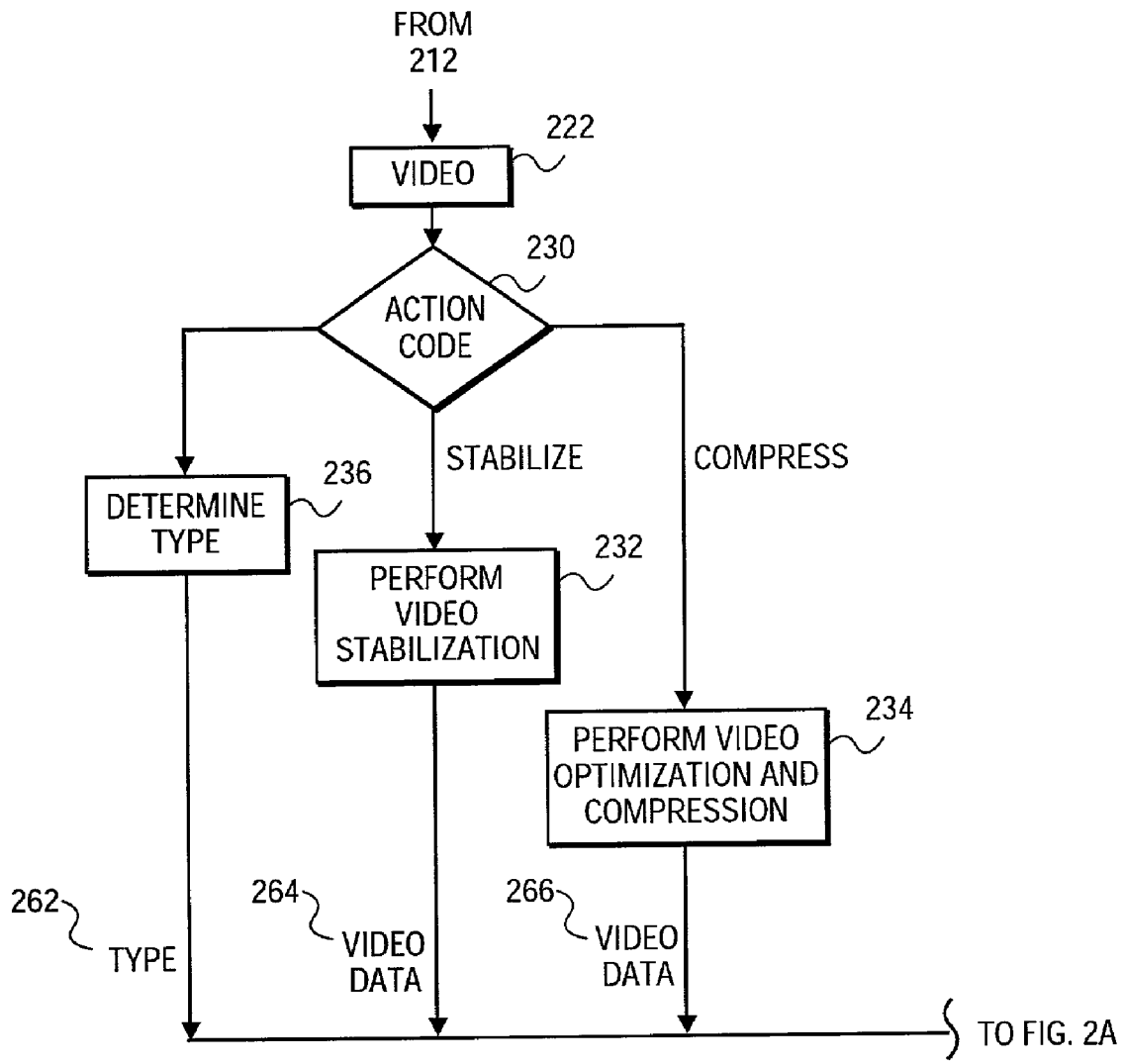
Figure 2C:
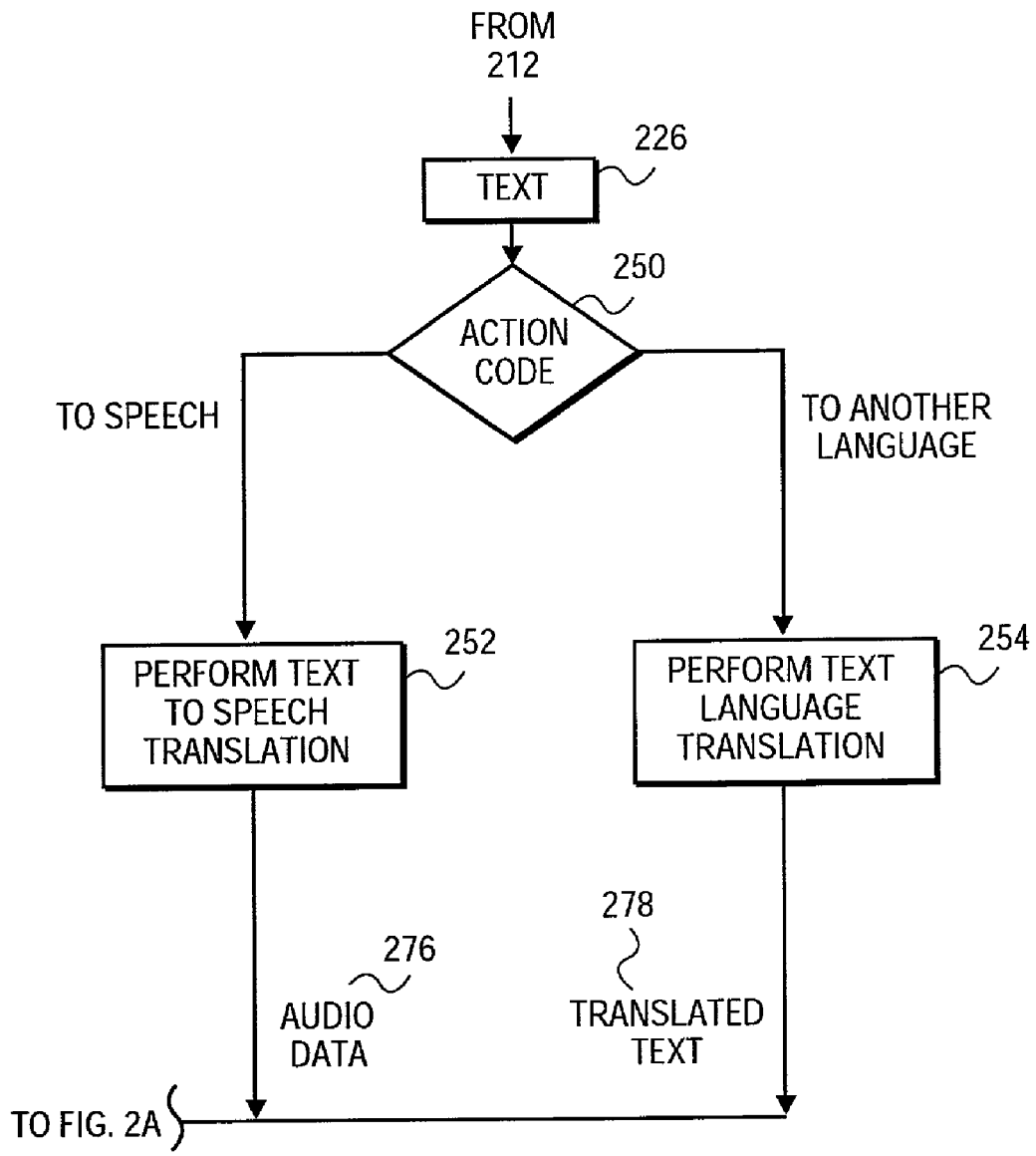

FIGS. 2A, 2B and 2C illustrate the flow of actions taken according to an embodiment of a method to process time-based media data. In one embodiment, the TBM software receives sample data, a data class identifier, an action code and a callback routine, as shown in block 210. In various embodiments, the data class identifier and/or the action code are optional or may not be supported. The sample data may be a sequence of image frames, audio data, text, multimedia data and other data comprising audio, video and/or other data captured over a period of time such that the audio video and other data are associated with and include time data. In one embodiment, the sample data may be analyzed to determine the class of data contained therein, such as audio, video, text, and/or multimedia. In other embodiments, other combinations and other types of sample data may be supported. In one embodiment, the class of sample data may be passed as an argument such as the data class identifier. In this embodiment, the class of sample data may be checked, as shown in block 212, to determine what processing will then occur.

If the sample data is a video sample, as shown in block 222, then, in one embodiment, the action code is checked to determine what kind of processing will be performed on the video sample, as shown in block 230. In one embodiment, the processing supported and, therefore, the action codes supported for video samples are (1) stabilization and (2) optimization and compression. In other embodiments, other processing and other action codes may be supported. In another embodiment, stabilization, optimization, and compression may be performed either concurrently or in succession. In one embodiment, no action code is necessary, and the processing performed is whatever processing is provided by the TBM processing software, such as, for example, stabilization, optimization, and/or compression. In one embodiment, if the action code is "stabilize", video stabilization processing is performed as shown in block 232. The resulting processed video data 264 is passed to the callback routine which is then invoked with the processed video data as an argument, as shown in block 280. If the action code is "compress", video optimization and compression are performed, as shown in block 234. The resulting processed vide data 266 is passed to the callback routine which is then invoked with the processed video data as an argument, as shown in block 280. In one embodiment, the action code may specify "determine type." In this embodiment, the TBM processing software analyzes the video sample data and determines the type of video sample data, as shown in block 236. A type identifier 262 or type data such as resolution in pixels, number of frames, encoding scheme used, format, etc. of the video sample data may be passed to the callback routine. The callback routine is then invoked with the type identifier and/or type data as arguments, as shown in block 280.

If the sample data is audio, as shown in block 224, then, in one embodiment, the type of audio is then determined by analysis of sample data to learn, in one embodiment, whether the audio is speech or music, as shown in block 228. That is, analysis of the audio sample is performed to determine whether the audio data is human voice or instrumental music. This check is made because the frequency properties of human voice require that a different method of compression be used than that which is used for instrumental music. A check is then made to determine whether the action code is "determine type", as shown in block 238. If the action code is "determine type", the TBM processing software then passes a type identifier 274 and/or type data such as length of sample, encoding scheme used, format, etc. of the audio sample data to the callback routine. The callback routine is then invoked with the type identifier and/or type data as arguments, as shown in block 280. If the action code is not "determine type", the TBM processing software proceeds based on a check to determine the type of audio data contained in the sample data, as shown in block 240. If the audio sample is human voice, then, in one embodiment, the action code is checked to determine what kind of processing will be performed on the audio sample, as shown in block 242. In one embodiment, the processing supported and, therefore, the action codes supported for human voice in the form of speech audio samples are speech to text translation and speech compression. In other embodiments, other processing and other action codes may be supported. If the action code is "speech to text", then speech to text translation is performed, as shown in block 244. The resulting text 268 is passed to the callback routine which is then invoked with the text as an argument, as shown in block 280. If the action code is "compress", then compression of the audio sample is performed, as shown in block 246. In other embodiments, no action code may be accepted, and the TBM processing software may default to and provide support for only one kind of processing, such that either speech to text translation, compression or another action is performed. The resulting processed audio data 270 is passed to the callback routine which is then invoked with the processed audio data as an argument, as shown in block 280. If the check in block 240 shows that the audio sample is music, then music compression is performed, as shown in block 248. In other embodiments, an action code may be checked and the type of processing performed may be based on the action code. For example, other kinds of processing supported may include limiting the music sample, enhancing the music sample, adding 3D properties to the music sample, etc. The resulting processed audio data 272 is passed to the callback routine which is then invoked with the processed audio as an argument, as shown in block 280.

If the sample data is text, as shown in block 226, then, in one embodiment, the action code is checked to determine what kind of processing will be performed on the text sample, as shown in block 250. In one embodiment, the processing supported and, therefore, the action codes supported for speech audio samples are text to speech translation and translation to another language. In other embodiments, other processing and other action codes may be supported. If the action code is "to speech", then text to speech translation is performed, as shown in block 252. The resulting speech in the form of audio data 276 is passed to the callbakc routine which is then invoked with the audio data as an argument, as shown in block 280. If the action code is "to another language" or is a code representing a particular language, then translation of the text sample to the particular language or a default language is performed, as shown in block 254. The resulting translated text 278 is passed to the callback routine which is then invoked with the translated text as an argument, as shown in block 280. In other embodiments, no action code may be accepted, and the TBM processing software may default to and provide support for either text to speech translation or translation to only one default language. In another embodiment (not shown), if the action code specifies "to another language", a second check may then be made to determine to what language the text sample should be translated by examining a "language" code provided.

After the particular processing is performed as shown in blocks 232, 234, 244, 246, 248, 252, and 254, the specified callback routine is invoked, as shown in block 280, as discussed above. The callback routine may be invoked with a pointer to a location in memory containing the processed sample data, resulting text data, translated text data, or a different type of media data as an argument. The data length of the processed sample data may also be provided as an argument to the callback routine. In one embodiment, the callback routine may be invoked with a type identifier as an argument with or without sample data.

Figure 3:
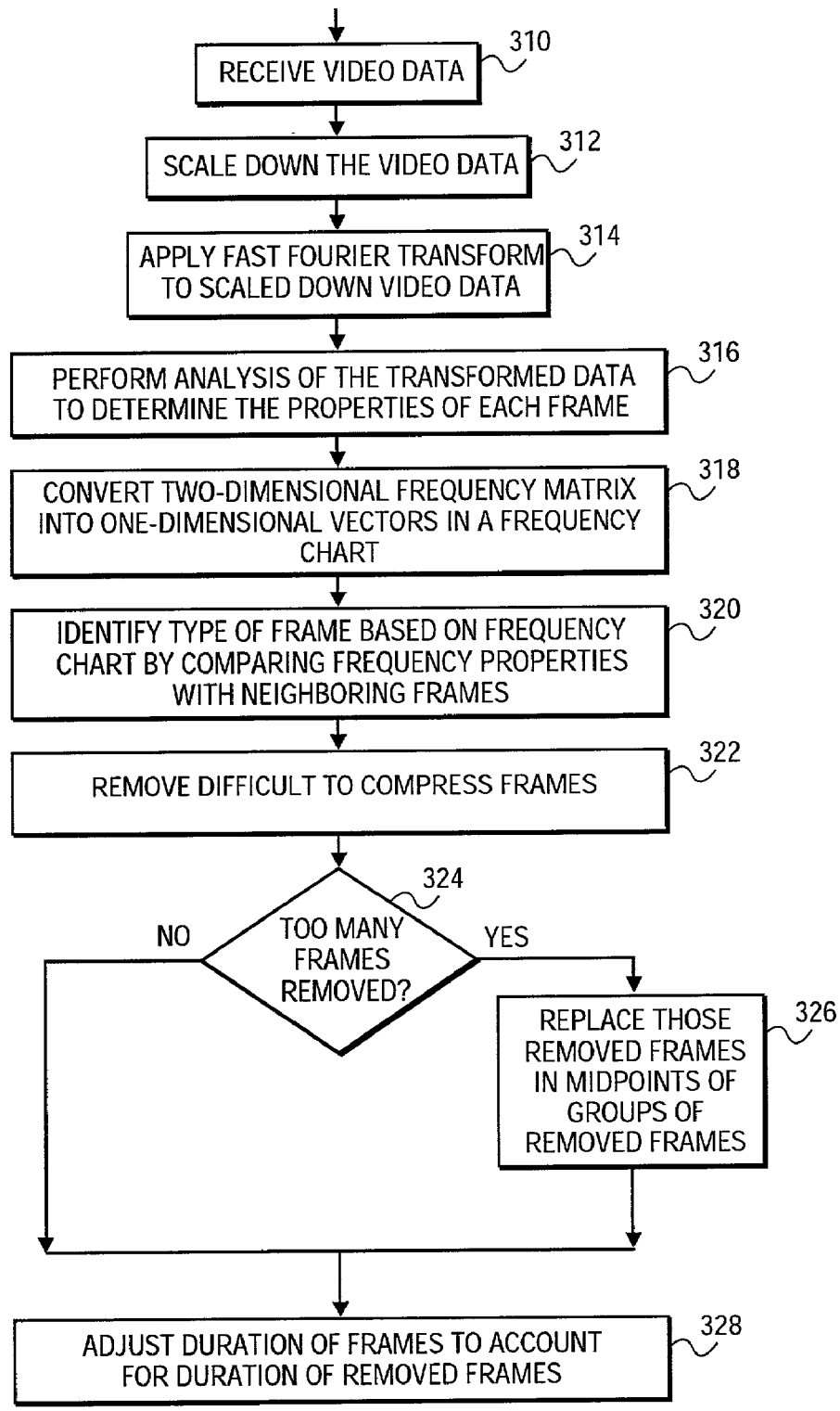
FIG. 3 illustrates the flow of actions taken according to an embodiment of a method to compress and optimize a sequence of image frames.
Figure 4A:
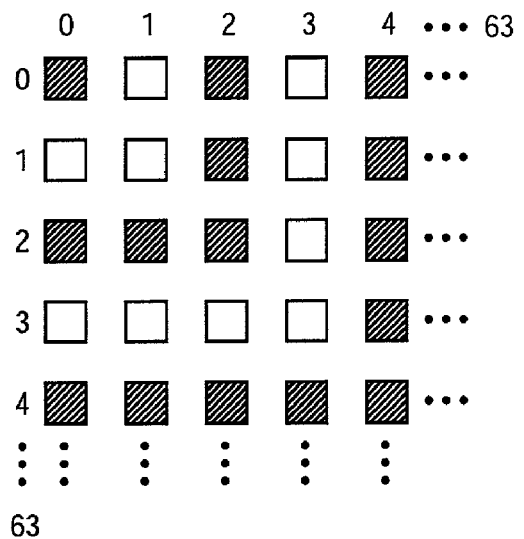
FIG. 4A illustrates a two-dimensional matrix of frequency data transformed from pixel values of an image that has been scaled down.

FIG. 3 illustrates the flow of actions taken according to an embodiment of a method to optimize and compress a sequence of image frames. When a video sample is received, in various embodiments, the TBM processing software may default to performing optimization and compression of the video sample, or an action code may designate that the video sample should be optimized and compressed. After the video sample is received, as shown in block 310, the video data is scaled down, as shown in block 312. In one embodiment, the video data is converted from whatever color format it is in into a gray scale format. For example, in one embodiment, each 24 bit pixel color red-green-blue (RGB) image is scaled down and converted to a 64×64 eight bit grayscale image. By reducing the size of the data representing the image by creating a scaled down version of the video sample, the speed of processing the video sample is increased because the computing power required to process the scaled down video data is less than is required to process the original video data. A fast fourier transform (FFT) is then applied to the scaled down video data, as shown in block 314. The result may be referred to as transformed video data. Analysis is then performed on the transformed video data to determine the properties of each frame, as shown in block 316. The transformed video data may first be represented as a two-dimensional frequency matrix resulting from application of the FFT in block 314. FIG. 4A illustrates a two-dimensional matrix of frequency data transformed from pixel values of an image that has previously been scaled down. This two-dimensional matrix may be referred to as transformed video data. The transformed video data may then be converted from the two-dimensional matrix into one-diamond vectors known as a frequency chart, as shown in block 318. The transformed video data may be represented as $D_{ij}$ where i=0–0 and j=0–63. The transformed video data is converted into one-dimensional frequency charts $C_k$ by application of the following equation:

$$C_k = (\Sigma D_{ij})/(2k+1) \ (i=k \text{ or } j=k) \text{ and } (\leq k \text{ and } j \leq k)$$
$$(k=0 \ldots 63)$$

Figure 4B:
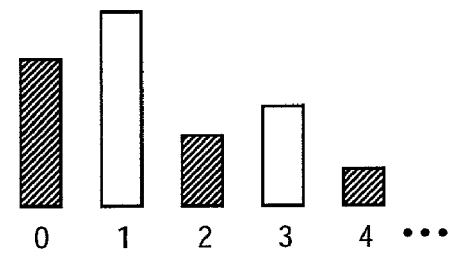
FIG. 4B illustrates a one-dimensional version of frequency data transformed from pixel values of an image that has previously been scaled down

FIG. 4B illustrates a one-dimensional version of frequency data transformed from pixel values of an image that has previously been scaled down. FIG. 4B shows the result of converting the two-dimensional matrix shown in FIG. 4A. The one-dimensional frequency data may be referred to as a "frequency chart" and represents the frequency data. The frequency chart is then analyzed to identify frame types by comparing the frequency properties for frames with neighboring frames, as shown in block 320. Frame types may include scene change, fast motion, fade in/fade out, smooth motion, solid color, etc. Difficult to compress frames, if found, are then removed, as shown in block 322. A check may be made to determine whether too many frames were removed, as shown in block 324. If too many frames were removed, frames at the midpoint of larger groups of removed frames may be recovered and reinstituted or replaced back into the sample data, as shown in block 326. After difficult to compress frames have been removed, the various durations of frames in the sample data are adjusted to account for the duration of the removed frames, so that the duration of the whole sequence remains the same, as shown in block 328.

Figure 5A:
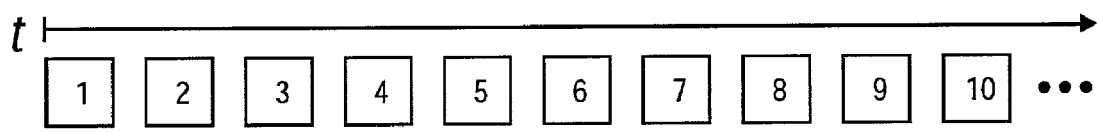
FIG. 5A illustrates a sequence of images frames and their relative duration over time as originally provided.
Figure 5B:
FIG. 5B illustrates a sequence of image frames and their relative duration over time with difficult to compress frames removed by application of a method described herein.
Figure 5C:
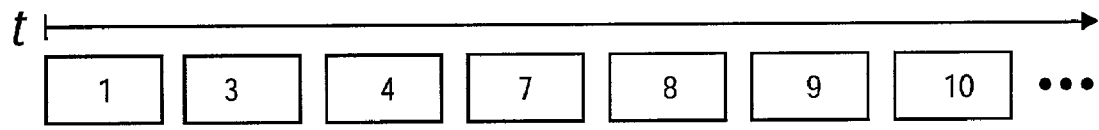
FIG. 5C illustrates a sequence of image frames and their relative duration over time after being processed by application of a method described herein.

The effect of removing difficult to compress frames can be clearly seen by review of FIGS. 5A, 5B and 5C. FIG. 5A illustrates a sequence of image frames and their relative duration over time as originally provided. In this video sequence, each image frame is of equal duration. After the image frames are analyzed and identified, in one embodiment, the type of frames are directly output and, in another embodiment, difficult to compress frames are removed from the sample. FIG. 5B illustrates a sequence of image frames and their relative duration over time t with difficult to compress frames removed by application of a method described herein. In the example shown in FIG. 5B, frames 2, 5 and 6 were removed from the original image frame sequence of the video sample of FIG. 5A. After the difficult to compress image frames are removed, the duration of remaining image frames may be increased, and the start time of the remaining frames may be shifted or changed to fill the time lost when the hard to compress image frames are removed. FIG. 5C illustrates a sequence of image frames and their relative duration over time t after being processed by application of a method described herein. In one embodiment, as shown in FIG. 5C, the duration of all frames of an image sequence may be increased equally to compensate for the duration of removed frames. In another embodiment, the duration of only frames adjacent to the removed frames may be increased to compensate for the duration of the removed frames. Other schemes may also be used to adjust the duration of remaining frames to compensate for the duration of the removed difficult to compress frames.

Figure 6:
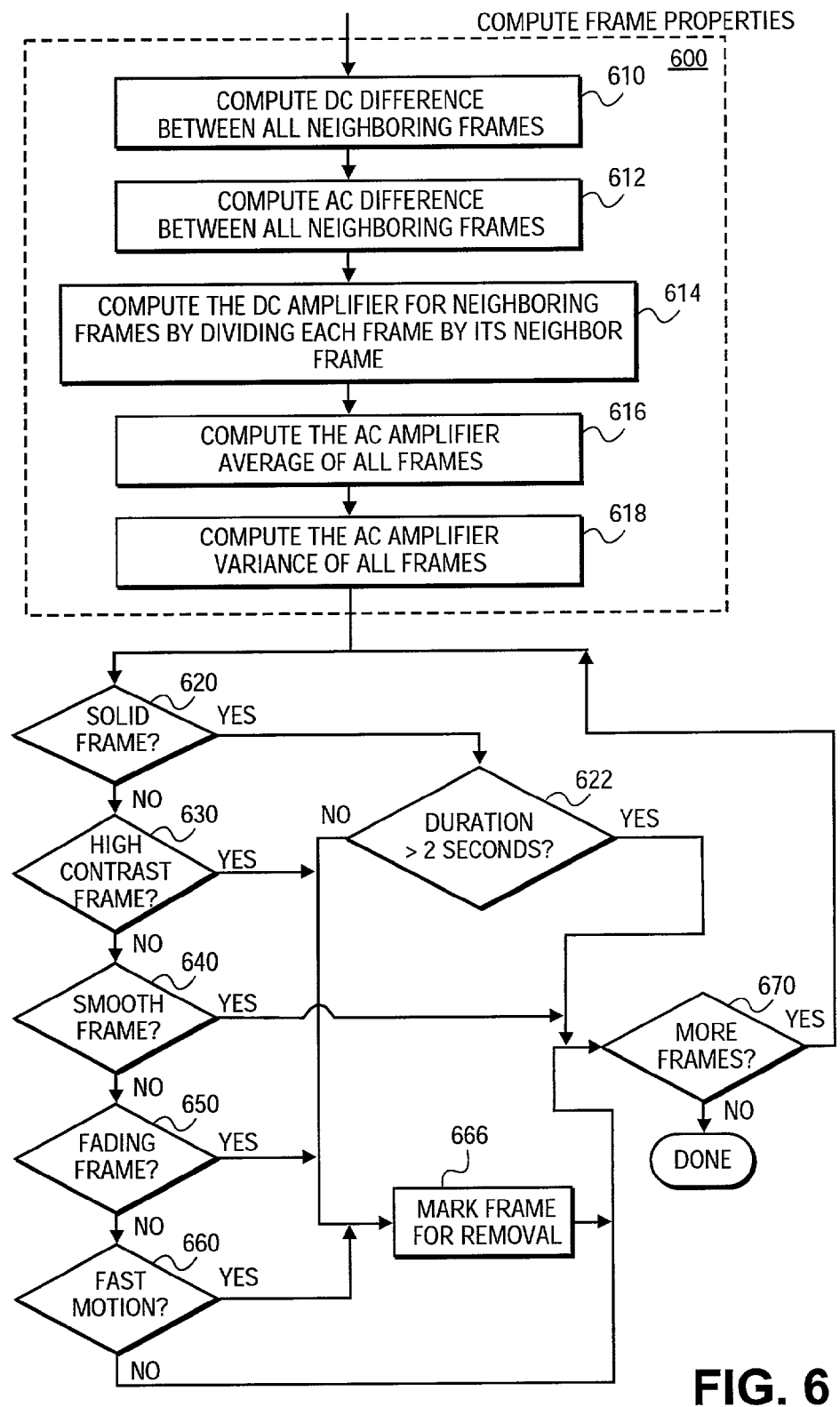
FIG. 6 illustrates the flow of actions taken to identify and remove difficult to compress frames of a sequence of image frames according to an embodiment of a method described herein.

FIG. 6 illustrates the flow of action taken to identify and remove difficult to compress frames of a sequence of image frames according to an embodiment of a method described herein. In one embodiment, five computations are made to prepare data which are then used to identify specific kinds of frames which are candidates for removal and which may then be removed. The five computations are "get DC difference", "get AC difference", "get DC amplifier", "get AC amplifier average", and "get AC amplifier variance". The computations are based on well known analogous computations regarding alternating current (AC) and direct current (DC) in the field of electricity.

The flow of the actions taken according to one embodiment of the computation of frame properties is shown in block 600. As to the "AC difference" and the "DC difference" properties for the images involved in the inventions described herein, DC refers to the first element of the one-dimensional frequency chart data such that the "DC difference" represents the change in brightness. The rest of the elements in the one-dimensional frequency chart data represent AC values such that the "AC difference" represents the change in content detail between two frames. The "DC difference" between each frame and its neighboring frame is computed, as shown in block 610. This computation is made using the one-dimensional frequency chart of the sample data. That is, for all adjacent frames A and B in the sample data, in one embodiment, this may be computed according to the following equation:

float DC_Difference=|ChartDataB[0]−ChartData[0]|

The "AC difference" between all neighboring frames A and B using the one-dimensional frequency chart of the sample data is then computed, as shown in block 612. In one embodiment, this may be computed according to the following equation:

float AC_Difference=$\Sigma_{i=1\ to\ 63}$(ChartDataB[i]−ChartData[i])*weight[i]

The "DC amplifier" for all neighboring frames A and B may then be computed using the one-dimensional frequency chart of the sample data, as shown in block 614. In effect, the "DC amplifier" property describes how much the DC part or brightness changed from the previous frame to the current frame. In one embodiment, this may be computed according to the following equation:

float DC_Amplifier=ChartDataB[0]/ChartDataA[0]

The "AC amplifier average" of all frames may then be computed using the one-dimensional frequency chart of the sample data, as shown in block 616. In effect, the "AC amplifier average" property describes the average changes in the content details between two frames. In one embodiment, this may be computed according to the following equation:

float AC_AmplifierAverage=

$$\left(\sum_{i=1\ to\ 63} (ChartDataB[i]/ChartDataA[i])\right)/63$$

The "AC amplifier variance" of all frames is then computed, as shown in block 618. The "AC amplifier variance" reflects the difference of changes spread out among the AC spectrum which describes the difference of changes among the frequency values of the frames. For example, a pair of images with a smaller "AC amplifier variance" value will have similar differences among all frequencies so that they still look similar, while another pair of images with a larger "AC amplifier variance" value will be more dissimilar. In one embodiment, this may be computed according to the following equation:

float AC_AmplifierVariance=

$$sqrt\left(\sum_{i=1\ to\ 63}([(ChartDataB[0]/ChartDataA[0]-AC\_AmplifierAverage^2]*weight[i])\right)$$

The order of the computation of the various frame frequency properties in block 600 is not important, and the frame frequency properties may be computed in any order.

After the five frame frequency properties have been computed in block 600, various checks are made using the frame properties to determine a type for each of the frames. A check may be made to determine whether the frame is a solid frame, as shown in block 620. A solid frame is a frame that is a solid color throughout. The determination of whether a frame is solid may be made, in one embodiment, as shown in the following pseudocode. This pseudocode and the other pseudocode examples provided herein each set forth one of various possible embodiments which provide the functionality of the methods described herein. The SolidFrameThreshold is a constant value. Example values of this and other constants discussed herein are contained in Appendix A attached hereto.

Boolean SolidFrame{

If $\sum_{i=1\ to\ 63}$ (ChartData[i]*weight[i] < SolidFrameThreshold)

Then return (TRUE);

Else return (FALSE)}

If the frame is a solid frame, the duration of the frame is then checked, as shown in block 622. If the duration of the solid frame not greater than a time threshold such as, for example, two seconds, the frame is marked as a candidate for removal, as shown in block 666. If the duration of the solid frame is greater than the time threshold, such as, for example, two seconds, the frame is passed over and the next frame is analyzed by checking whether there are more frames to analyze, as shown in block 670.

If the frame is not a solid frame, execution continues at block 630 in which a check may be made to determine whether the frame is a high contrast frame, as shown in block 630. A frame is considered a high contrast frame if the luminescence or brightness varies greatly from the previous frame. If the frame is a high contrast frame, it is marked as a candidate for removal as shown in block 666. The determination of whether a frame is a high contrast frame may be made by comparing the "AC difference" of the frame with a system set constant, referred to in one embodiment as the verySmallACDifferenceThreshold. If the "AC difference" is less than the system set constant, then the frame is not a high contrast frame, and execution continues at block 640. If the "AC difference" is greater than or equal to the system set constant, then the frame may be a high contrast frame and a check is made to determine whether the ratio of "DC difference" and "AC difference" of the frame is greater than a frame contrast threshold, referred to in one embodiment as SolidFrameContrastThreshold. If the ratio of the "DC difference" to the "AC difference" is greater than the frame contrast threshold, then the frame is a high contrast frame.

If the frame is a high contrast frame, then the frame is marked as a candidate for removal, as shown in block 666. A check is then made to determine whether there are more frames to analyze, as shown in block 670. The determination of whether a frame is a high contrast frame may be made, in one embodiment, as shown in the following pseudocode:

```
Boolean HighContrast Frame{
    If AC_Difference<verySmallACDifferenceThreshold
        Then return(FALSE);
    Else if DC_Difference/
        AC_Difference>SolidFrameContrastThreshold
        Then return(TRUE);
    Else return(FALSE)}
```

If a frame is neither a solid frame nor a high contrast frame, a check may be made to determine whether the frame is a smooth frame, as shown in block 640. A smooth frame is a frame that is very similar to, has few differences when compared to the previous frame. If the frame is a smooth frame, it is retained and execution continues at block 670. The determination of whether a frame is smooth may be made, in one embodiment, as shown in the following pseudocode:

```
Boolean SmoothFrame{
    If ((DC_Difference*SmoothFrameDCWeight)+
        (AC_Difference*SmoothFrameACWeight))
        <SmoothFrameThreshold)
        Then return(TRUE);
    Else return(FALSE);}
```

If the frame is not a smooth frame, a check may be made to determine whether the frame is a fading frame, as shown in block 650. A fading frame is a frame that gradually gets brighter or darker when compared to the previous frame. Fading frames result from a commonly used video editing effect that often is placed at the beginning of a new scene (fade in) or end of an existing screen (fade out). If the frame is a fading frame, it is marked as a candidate for removal, as shown in block 666. A check is then made to determine whether there are more frames to analyze, as shown in block 670. The determination of whether a frame is fading may be made, in one embodiment, according to the following pseudocode:

```
Boolean Fading Frame{
    If ((DC_Difference<FadeCheckDCDifference
        ThresholdHigh) and
        (DC_Difference>FadeCheckDCDifference
            ThresholdLow))
    and
    (((DC_Amplifier<FadeCheckDCAmplifier
        ThresholdHigh) and
    (DC_Amplifier>FadeCheckDCAmplifier
        ThresholdLow))
    or
    ((DC_Amplifier>1/FadeCheckDCAmplifierThresh-
        oldHigh) and
    (DC_Amplifier<1/FadeCheckDCAmplifierThresh-
        oldLow)))
    and
    ((AC_Amplifier Variance<ThirdFadeThreshdoldHigh)
    and
    (AC_AmplifierVariance>ThirdFadeThreshold
        Low)))}
```

If the frame is not a fading frame, a check may be made to determine whether the frame is a fast motion frame, as shown in block 660. A fast motion frame is characterized in that irregular changes occur such that the change cannot be characterized as any of the previously described frame types. A fast motion frame can be a scene change frame or a frame that includes many fast motion objects. If the frame is a fast motion frame, it is marked as a candidate for removal, as shown in block 666. The determination of whether a frame is a fast motion frame may be made, in one embodiment, according to the following pseudo code:

```
Boolean Fast Motion Frame{
    If ((DC_Difference<MotionCheckDCDifference
        ThresholdHigh) and
        (DC_Difference>MotionCheckDCDifference
            ThresholdLow))
    or
    ((AC_Difference<MotionCheckACDifference
        ThresholdHigh)
    and
    (AC_Difference>MotionCheckACDifference
        ThresholdLow))
    Then Return(TRUE);
    Else Return(FALSE)}
```

After all of the checks for and identifying particular kinds of frame are completed, as shown in blocks 620, 630, 640, 650 and 650, a check is then made to determine whether there are more frames to analyze, as shown in block 70. If there are more frames, execution loops to and continues at block 620. If there no further frames to analyze, identifying and marking for removal ends. Note that the order of classifying each frame and determining whether it is a candidate for removal is important and the classification and removal decisions should be made in the described order. In addition, additional checks for additional kinds of frames to determine which frames are candidates for removal may be made.

In the foregoing specification, the invention has been described with reference to specific embodiments thereof. It will, however, be evident that various modifications and changes can be made thereto without departing from the broader spirit and scope of the invention as set forth in the appended claims. The specification and drawings are, accordingly, to be regarded in an illustrative rather than a restrictive sense.

What is claimed is:

1. A method comprising:
   receiving a plurality of sample data;
   processing the sample data based on at least a class of the sample data, the processing including,
   performing video compression of the sample data if the class of the sample data is video, the performing video compression including identifying difficult to compress frames by determining a color frequency chart for each video frame of the sample data and comparing the color frequency charts of neighboring video frames of the sample data, wherein the performing video compression comprises scaling down the sample data to create a plurality of scaled down sample data, applying a Fast Fourier Transform to the scaled down sample data to create a plurality of transformed data, preparing the color frequency charts based on the transformed data; and preparing a plurality of properties data based on the color frequency charts, and wherein performing video compression comprises removing difficult to compress frames from the sample data to create a plurality of compressed sample data; and adjusting the duration of at least some of the frames of the compressed sample data to compensate for the duration of those frames that were removed; determining whether the type of the sample data is voice or music if the class of the sample data is audio,
   if the sample data type is voice, then performing either speech to text translation or speech compression, if the sample data type is music, then performing music compression, performing either text to speech translation or performing language translation if the class of the sample data is text; and returning a plurality of processed sample data.

2. The method of claim 1 wherein receiving comprises: receiving a callback routine.

3. The method of claim 2 wherein returning comprises: invoking the callback routine.

4. The method of claim 1 wherein receiving comprises: receiving an action code such that the processing is also based on the action code.

5. The method of claim 1 wherein the difficult to compress frames include certain solid frames, certain high contrast frames, certain fading frames, and certain fast motion frames.

6. The method of claim 1 wherein preparing the plurality of properties data comprises:
computing an AC difference data for each frame of the sample data;
computing a DC difference data regarding the sample data;
computing an AC amplifier regarding the sample data;
computing a DC amplifier data regarding the sample data; and
computing an AC amplifier variance data for each of the frames of the sample data.

7. The method of claim 1 wherein identifying comprises:
evaluating the sample data to determine which frames are solid frames;
evaluating the sample data to determine which frames are high contrast frames;
evaluating the sample data to determine which frames are smooth frames;
evaluating the sample data to determine which frames are fading frames; and
evaluating the sample data to determine which frames are fast motion frames.

8. The method of claim 7 wherein removing certain hard to compress frames comprises:
removing solid frames that with a duration less than a defined minimum;
removing high contrast frames which exceed a defined contrast threshold;
keeping all smooth frames;
removing fading frames having frame properties outside a plurality of system defined fading threshold values; and
removing fast motion frames having frame properties outside a plurality of system defined fast motion threshold values.

9. A computer-readable medium having a computer program encoded thereon, wherein the computer program when executed by a processor causes the processor to perform operations comprising:
receiving a plurality of sample data;
processing the sample data based on at least a class of the sample data, the processing including,
performing video compression of the sample data if the class of the sample data is video, the performing video compression including identifying difficult to compress frames by determining a color frequency chart for each video frame of the sample data and comparing the color frequency charts of neighboring video frames of the sample data, wherein the performing video compression comprises scaling down the sample data to create a plurality of scaled down sample data, applying a Fast Fourier Transform to the scaled down sample data to create a plurality of transformed data, preparing the color frequency charts based on the transformed data, and preparing a plurality of properties data based on the color frequency charts, and wherein the performing video compression further comprises removing difficult to compress frames from the sample data to create a plurality of compressed sample data, and adjusting the duration of at least some of the frames of the compressed sample data to compensate for the duration of those frames that were removed,
determining whether the type of the sample data is voice or music if the class of the sample data is audio,
if the sample data type is voice, then performing either speech to text translation or speech compression,
if the sample data type is music, then performing music compression, performing either text to speech translation or performing language translation if the class of the sample data is text; and
returning a plurality of processed sample data.

10. The computer-readable medium of claim 9 wherein receiving comprises:
receiving a callback routine.

11. The computer-readable medium of claim 9 wherein returning comprises:
invoking the callback routine.

12. The computer-readable medium of claim 9 wherein receiving comprises:
receiving an action code such that the processing is also based on the action code.

13. The computer-readable medium of claim 9 wherein the difficult to compress frame include certain sold frames, certain high contrast frames, certain fading frames, and certain fast motion frames.

14. The computer-readable medium of claim 9 wherein preparing the plurality of properties data comprises:
computing an AC difference data for each frame of the sample data;
computing a DC difference data regarding the sample data;
computing an AC amplifier regarding the sample data;
computing an DC amplifier data regarding the sample data; and
computing an AC amplifier variance data for each of the frames of the sample data.

15. The computer-readable medium of claim 9 wherein identifying comprises:
evaluating the sample data to determine which frames are solid frames;
evaluating the sample data to determine which frames are high contrast frames;
evaluating the sample data to determine which frames are smooth frames;
evaluating the sample data to determine which frames are fading frames; and
evaluating the sample data to determine which frames are fast motion frames.

16. The computer-readable medium of claim 15 wherein removing certain hard to compress frames comprises:
removing solid frames that with a duration less than a defined minimum;
removing high contrast frames which exceed a defined contrast threshold; keeping all smooth frames;
removing fading frames having frame properties outside a plurality of system defined fading threshold values; and removing fast motion frames having frame properties outside a plurality of system defined fast motion threshold values.

17. A system comprising:
a processor coupled to a bus;
a memory coupled to a bus; and
a storage device coupled to the bus, the storage device having instructions stored thereon which when executed by the processor cause the system to perform operations comprising
receiving a plurality of sample data;
processing the sample data based on at least a class of the sample data, the processing including,
performing video compression of the sample data if the class of the sample data is video, the performing video compression including identifying difficult to compress frames by determining a color frequency chart for each video frame of the sample data and comparing the color frequency charts of neighboring video frames of the sample data, wherein the performing video compression comprises removing difficult to compress frames from the sample data to create a plurality of compressed sample data, adjusting the duration of at least some of the frames of the compressed sample data to compensate for the duration of those frames that were removed, and wherein the performing video compression further comprises scaling down the sample data to create a plurality of scaled down sample data, applying a Fast Fourier Transform to the scaled down sample data to create a plurality of transformed data, preparing the color frequency charts based on the transformed data, and preparing a plurality of properties data based on the color frequency charts, determining whether the type of the sample data is voice or music if the class of the sample data is audio,
if the sample data type is voice, then performing either speech to text translation or speech compression,
if the sample data type is music, then performing music compression,
performing either text to speech translation or performing language translation if the class of the sample data is text; and
returning a plurality of processed sample data.

18. The system of claim 17 wherein the difficult to compress frames include certain solid frames, certain high contrast frames, certain fading frames, and certain fast motion frames.

19. The system of claim 17 wherein preparing the plurality of properties data comprises:
computing an AC difference data for each frame of the sample data;
computing a DC difference data regarding the sample data;
computing an AC amplifier regarding the sample data;
computing a DC amplifier data regarding the sample data; and
computing an AC amplifier variance data for each of the frames of the sample data.

20. The system of claim 17 wherein identifying comprises:
evaluating the sample data to determine which frames are solid frames;
evaluating the sample data to determine which frames are high contrast frames;
evaluating the sample data to determine which frames are smooth frames;
evaluating the sample data to determine which frames are fading frames; and
evaluating the sample data to determine which frames are fast motion frames.

21. The system of claim 20 wherein removing certain hard to compress frames comprises:
removing solid frames that with a duration less than a defined minimum;
removing high contrast frames which exceed a defined contrast threshold;
keeping all smooth frames;
removing fading frames having frame properties outside a plurality of system defined fading threshold values; and
removing fast motion frames having frame properties outside a plurality of system defined fast motion threshold values.

22. A system comprising:
means for receiving a plurality of sample data;
means for processing the sample data based on at least a class of the sample data, the means for processing including,
means for performing video compression of the sample data when the class of the sample data is video, the means for performing video compression including means for identifying difficult to compress frames by determining a color frequency chart for each video frame of the sample data and means for comparing the color frequency charts of neighboring video frames of the sample data, wherein the means for the performing video compression comprises means for removing difficult to compress frames from the sample data to create a plurality of compressed sample data, and means for adjusting the duration of at least some of the frames of the compressed sample data to compensate for the duration of those frames that were removed, and wherein the means for the performing video compression is configured to scale down the sample data to create a plurality of scaled down sample data, applying a Fast Fourier Transform to the scaled down sample data to create a plurality of transformed data, prepare the color frequency charts based on the transformed data; and prepare a plurality of properties data based on the color frequency charts,
means for determining whether the type of the sample data is voice or music when the class of the sample data is audio,
means for performing either speech to text translation or speech compression when the sample data is voice,
means for performing music compression when the sample data is music,
means for performing either text to speech translation or performing language translation when the class of the sample data is text; and
means for returning a plurality of processed sample data.

23. The system of claim 22 wherein the difficult to compress frames include certain solid frames, certain high contrast frames, certain fading frames, and certain fast motion frames.

24. The system of claim 22 wherein the means the means for performing video compression is further configured to:
compute an AC difference data for each frame of the sample data;
compute a DC difference data regarding the sample data;
compute an AC amplifier regarding the sample data;
compute a DC amplifier data regarding the sample data; and
compute an AC amplifier variance data for each of the frames of the sample data.

25. The system of claim 24 wherein the means for identifying is configured to:

evaluate the sample data to determine which frames are solid frames;
evaluate the sample data to determine which frames are high contrast frames;
evaluate the sample data to determine which frames are smooth frames;
evaluate the sample data to determine which frames are fading frames; and
evaluate the sample data to determine which frames are fast motion frames.

26. The system of claim 25 wherein the means for removing certain hard to compress frames is configured to:

remove solid frames that with a duration less than a defined minimum;
remove high contrast frames which exceed a defined contrast threshold;
keep all smooth frames;
remove fading frames having frame properties outside a plurality of system defined fading threshold values; and
remove fast motion frames having frame properties outside a plurality of system defined fast motion threshold values.

* * * * *